United States Patent [19]

Shimizu et al.

[11] Patent Number: 4,594,298
[45] Date of Patent: Jun. 10, 1986

[54] ZINC-CHLORIDE CELL

[75] Inventors: Shunji Shimizu, Tokyo; Yuichi Watakabe, Yokohama; Kunihiko Fujiwara, Yokohama; Toshiaki Yabumoto, Yokohama, all of Japan

[73] Assignee: The Furukawa Electric Co., Ltd., Tokyo, Japan

[21] Appl. No.: 736,443

[22] Filed: May 21, 1985

[30] Foreign Application Priority Data

Jun. 1, 1984 [JP] Japan .................... 59-112355

[51] Int. Cl.⁴ .................................. H01M 10/34
[52] U.S. Cl. .................................. 429/72; 429/101; 429/105
[58] Field of Search ............... 429/57, 72, 81, 101, 429/105, 199, 50, 51

[56] References Cited

U.S. PATENT DOCUMENTS

| 4,001,036 | 1/1977 | Berman et al. | 429/70 X |
| 4,413,040 | 11/1983 | Carr | 429/105 X |
| 4,490,446 | 12/1984 | Ramsay et al. | 429/57 |

Primary Examiner—Anthony Skapars
Attorney, Agent, or Firm—Frishauf, Holtz, Goodman & Woodward

[57] ABSTRACT

In a zinc-chloride cell of the invention, the gas phase in a cell container comprises a gas mixture of chlorine gas and an inert gas to allow easy control of the internal pressure of the cell during cell operation. During charging of the cell, the gas mixture is trapped, and the trapped gas mixture is blown into the electrolyte so as to reduce the chlorine concentration in the electrolyte.

6 Claims, 2 Drawing Figures

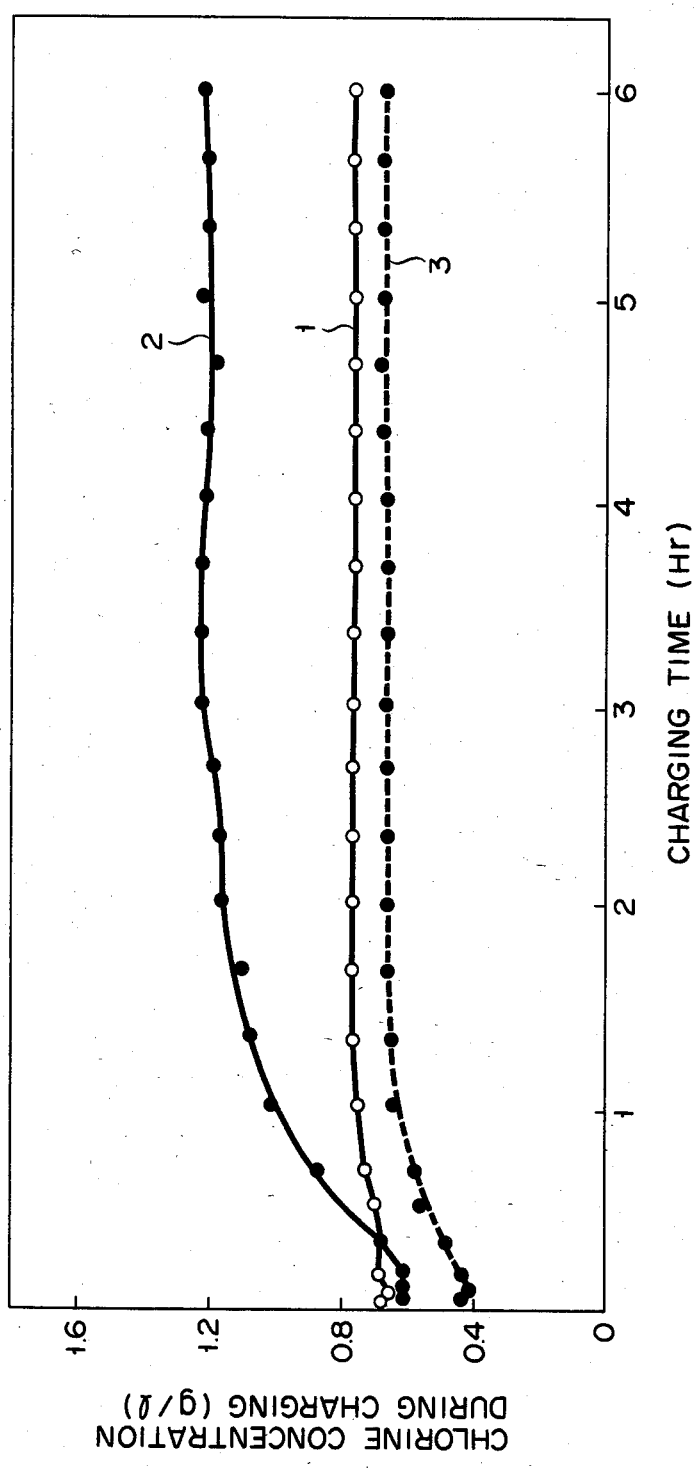

ZINC-CHLORIDE CELL

BACKGROUND OF THE INVENTION

The present invention relates to an improvement in a zinc-chloride cell in which the cell internal pressure in operation can be easily controlled and the chlorine concentration in an electrolyte during charging can be reduced.

In a zinc-chloride cell, chlorine is generated from a positive electrode (chlorine electrode) and zinc electrically deposits on a negative electrode (zinc electrode) during charging. Chlorine generated at the positive electrode is mixed with cooled water and is stored in the form of a solid, i.e., a chlorine hydrate. For discharging, the chlorine hydrate is heated and decomposed (at a decomposition temperature of 9.6° C. at normal pressure), dissolved in the electrolyte and supplied to the positive electrode.

The reaction of producing a chlorine hydrate from chlorine and cooled water is expressed by:

$$Cl_2 + xH_2O \rightleftarrows Cl_2 \cdot xH_2O (x: 6 \text{ to } 8)$$

The volume change after the reaction can be given by:

$$(6 \times 8 \times 1.1)/(22.4 \times 10^3 + 6 \times 18) = 1/189$$

for $x=6$, and $$(8 \times 18 \times 1.1)/(22.4 \times 10^3 + 8 \times 18) = 1/142$$

for $x=8$

Thus, the volume is considerably reduced upon this reaction.

A zinc-chloride cell is conventionally assembled in a sealed container, and the gas phase in the container consists of 100% chlorine. For this reason, when the hydrate decomposes, a change in internal pressure upon a change in volume of the container contents is large, and pressure control is difficult.

In addition, when the gas phase in the cell is 100% chlorine as in a conventional zinc-chloride cell, the chlorine concentration dissolved in the electrolyte is high, thus accelerating self corrosion of the zinc electrode and causing a large decrease in current efficiency. In order to prevent this, the dissolved chlorine concentration is conventionally decreased by various methods. In one method, a strong electrolyte such as sodium chloride or potassium chloride is added to the electrolyte or the temperature of the electrolyte is increased to decrease the solubility of chlorine in the electrolyte. Alternatively, the interior of the container is reduced in pressure or the chlorine partial pressure in the gas phase in the container is decreased to reduce the dissolved chlorine concentration.

However, a satisfactory effect is not obtained if only a strong electrolyte is added to the electrolyte or the temperature of the electrolyte is increased. In addition, when an excessive amount of a strong electrolyte is added or the temperature of the electrolyte is excessively increased, dendritic deposition at the zinc electrode is accelerated to cause short-circuiting with the chlorine electrode. In order to keep the interior of the container at a reduced pressure, the container must have a predetermined pressure resistance, resulting in problems with respect to size, weight and cost of the cell. Even if the chlorine partial pressure in the gas phase of the container is decreased, since the chlorine gas is dissolved in the electrolyte in a supersaturation state, the chlorine concentration in the electrolyte cannot be sufficiently reduced.

SUMMARY OF THE INVENTION

The present invention has resulted from extensive studies made in order to resolve the above problems and has as its object to provide a zinc-chloride cell which allows easy pressure control, can reduce the chlorine concentration in an electrolyte, and has a high efficiency of charging/discharging energy, a light weight and a low cost. In the cell of the present invention, the gas phase in the cell container is a gas mixture comprising chlorine gas and an inert gas so as to reduce a volume change accompanying a change of state between chlorine gas and chlorine hydrate. A device for trapping the gas mixture and blowing it into the electrolyte is used. During charging, the gas mixture is trapped and blown into the electrolyte by this device, and the chlorine concentration in the electrolyte is reduced.

BRIEF DESCRIPTION OF THE DRAWINGS

FIG. 2 is a graph showing changes in the chlorine concentration in an electrolyte during charging as a function of charging time in a cell of the present invention and in a conventional cell.

DETAILED DESCRIPTION OF THE PREFERRED EMBODIMENTS

Figure 1:
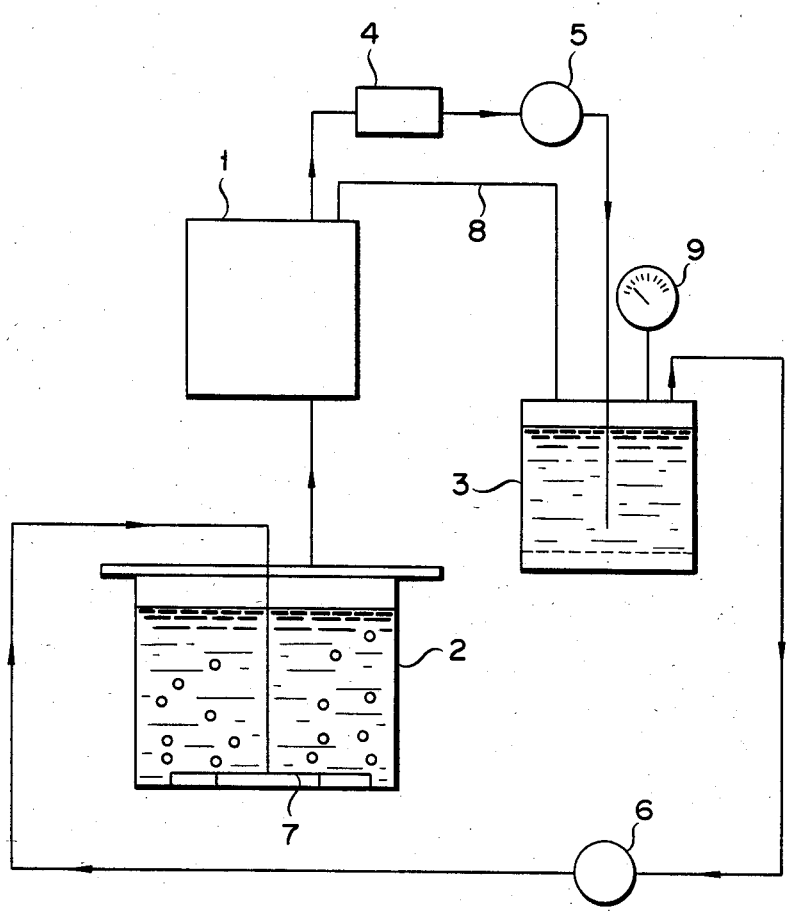
FIG. 1 is a schematic view showing an example of a cell according to the present invention.

In a cell of the present invention, as shown in FIG. 1 (the circulation circuit of the electrolyte and the chlorine supply circuit during discharging are omitted, and only a flow of the gas mixture is illustrated), a cell container comprises a cell main body 1, an electrolyte chamber 2 for supplying and circulating the electrolyte to the main body 1, and a hydrate chamber 3 which stores chlorine gas generated from the main body 1 as a hydrate during charging and generates and supplies chlorine gas into the electrolyte during discharging. The gas phase in the cell container is a gas mixture consisting of chlorine gas and an inert gas, and during charging the gas mixture is trapped and blown into the electrolyte. Note that the cell main body 1, the electrolyte chamber 2 and the hydrate chamber 3 are respectively sealed containers and are connected (not shown) to constitute the cell container. Therefore, the gas phase in any of the cell main body 1, the electrolyte chamber 2, and the hydrate chamber 3 is a gas mixture consisting of chlorine gas and an inert gas. The trapping site of the gas mixture can be freely set. However, the chlorine gas generated from the cell main body 1 during charging is passed together with the gas mixture through a chlorine-hydrogen reactor 4 (in order to prevent explosion, $H_2$ gas generated during charging/discharging is converted into HCl gas), and is supplied into the hydrate chamber 3 by a gas pump 5. Since the gas mixture remains at the upper portion of the chamber 3 as an unreacted gas, the gas mixture is conveniently trapped at this portion by a gas pump 6. The blowing site of the trapped gas can similarly be selected in the electrolyte. However, as shown in FIG. 1, the trapped gas is conveniently blown into the electrolyte in the chamber 2. The blown gas mixture flows in the direction indicated by the arrow in FIG. 1, and collects at the upper portion of the chamber 3. A gas mixture blowing portion 7 preferably comprises a porous polyvinyl chloride pipe, a glass ball bubbler or a ceramic bubbler, all of which have a high corrosion resistance in the cell system.

In a conventional cell in which the gas phase consists of 100% chlorine, when the chlorine gas content in the cell changes upon generation or decomposition of the hydrate, the cell internal pressure changes considerably in proportion to the chlorine gas content and presents a difficult control problem. In contrast to this, when the gas phase consists of a gas mixture of chlorine gas and an inert gas as in the cell according to the present invention, when the chlorine gas content in the cell changes, the pressure change in the cell is kept smaller than the change of the chlorine gas content in the cell due to presence of the inert gas. For this reason, operation control of the cell is easy.

Chlorine gas has a high solubility in an aqueuos solution having zinc chloride as a major constituent and is easily dissolved in a supersaturation state. However, when the gas mixture is blown into the electrolyte, the electrolyte is vigorously stirred. Then, the chlorine gas in the supersaturation state is transferred into the gas phase, and the chlorine concentration in the electrolyte is considerably decreased. As a result, self corrosion at the zinc electrode during charging is prevented, and current efficiency is improved.

As an inert gas to be mixed with the chlorine gas, nitrogen gas, argon gas, helium gas or the like is used. In particular, helium has a small molecular weight and imposes only a small load on a gas pump during trapping and blowing of the gas mixture. Furthermore, since helium has a weight equivalent to that of hydrogen gas, it prevents undesirable collection of hydrogen gas at a specific portion in the cell system, thereby considerably improving safety of the cell. The mixing ratio of the chlorine gas and an inert gas, in particular, helium gas, i.e., the chlorine substitution ratio (content of the chlorine gas in the gas mixture at normal pressure) is preferably 60 to 90% by volume. When the chlorine gas content in the gas mixture is less than 60% by volume, the dissolved chlorine concentration during discharging frequently cannot be kept at a required concentration. Together with this, the voltage efficiency is decreased. In contrast, when the chlorine gas content in the gas mixture exceeds 90% by volume, the dissolved chlorine concentration during charging is difficult to decrease, self corrosion of the zinc electrode is accelerated, and current efficiency is reduced.

According to the present invention, pressure control during charging/discharging of the cell is rendered easier, and the chlorine concentration in the electrolyte during charging can be reduced. Therefore, the energy efficiency of the cell can be improved, explosive reaction between chlorine gas and hydrogen gas can be prevented, and safety of cell systems is guaranteed, thereby providing many industrial advantages.

EXAMPLE

A cell as shown in FIG. 1 was prepared using the electrolyte composition at 35° C. and electrode construction shown below. A gas mixture of chlorine gas and helium gas was used such that the chlorine substitution ratio was 70% by volume. The charging/discharging test of a 1 kW cell (parallel circuit of two 500 W cells, each comprising laminated 30 cell) was performed under the following operating conditions:

Electrolyte
  Zinc chloride—2 mol/l
  Potassium chloride—1 mol/l
  Sodium chloride—3 mol/l
  pH—1.0
Electrode Construction
  60 zinc electrodes—(320 cm² effective area)
  60 chlorine electrodes—(320 cm² effective area)
Operating Conditions
  Charging power—1.25 kW
  Charging time—6 Hr
  Discharging power—1.00 kW
  Electrolyte flow rate—2 ml/cm². min The pressure of the space inside the hydrate chamber of the cell in operation was measured with a pressure meter 9 shown in FIG. 1. The obtained results are shown in Table 1 together with those obtained with a cell wherein the gas phase consisted of 100% chlorine (Comparative Example 1). Referring to FIG. 1, reference numeral 8 denotes a pressure balancing pipe.

TABLE 1

|  | During Charging | During Discharging |
|---|---|---|
| Variation in cell internal pressure with 100% chlorine gas phase (Comparative Example 1) | −0.28−<br>−0.15 kg/cm² | −0.08−<br>+0.12 kg/cm² |
| Variation in cell internal pressure with chlorine (70% by vol.) + helium (30% by vol.) gas phase (Example) | −0.21−<br>−0.18 kg/cm² | −0.05−<br>−0.01 kg/cm² |

During charging the gas pump 5 is turned on or off in accordance with the internal pressure so as to produce a chlorine hydrate in the amount corresponding to the amount of chlorine generated upon charging. During discharging, a hydrate heating heat-exchanger valve (not shown) is opened or closed in accordance with the internal pressure, thereby performing pressure control. As compared to the conventional cell wherein the gas phase consisted of 100% chlorine, the pressure variation could be reduced in the present invention, as shown in Table 1. During charging, the gas mixture was trapped at the upper portion of the hydrate chamber 3 and the trapped gas mixture was blown from a glass ball bubbler at the bottom of the electrolyte chamber 2. Changes in the chlorine concentration in the electrolyte during charging were measured, and the obtained results are shown by curve 1 in FIG. 2.

For the purpose of comparing the chlorine concentration during charging, results obtained when the blowing of the gas mixture into the electrolyte in the Example described above was stopped (Comparative Example 2) are indicated by curve 2 in FIG. 2. Results obtained when the chlorine substitution ratio of the gas mixture for blowing was 50% by volume (Comparative Example 3) are indicated by curve 3 in FIG. 2.

Referring to FIG. 2, the chlorine concentration (g/l) during charging is plotted along the axis of the ordinate, and the charting time (Hr) is plotted along the axis of the abscissa, thereby showing changes in chlorine concentration in the electrolyte during charging. As can be seen from FIG. 2, in the Example of the present invention, the chlorine concentration in the electrolyte does not change much from the beginning of the charging operation and is kept substantially at a constant value. During the testing, the cell efficiency was set such that the voltage efficiency was 87%, the current efficiency was 88.4%, the energy efficiency was 77.0%, and the average chlorine concentration in the electrolyte during charging was 0.76 g/l. In contrast to this, in Comparative Example 2, the increase in chlorine concentration in the electrolyte immediately after starting the charging operation was large. The average chlorine concentration in the electrolyte during charging was 1.12 g/l, and the charging/discharging energy efficiency of the cell remained at 72.5%. In Comparative Example 3, the average chlorine concentration in the electrolyte during charging could be kept as low as 0.66 g/l. However, since the chlorine substitution ratio of the gas mixture was as small as 50% by volume, chlorine dissolution in the electrolyte during discharging is insufficient. As a result, the current efficiency was 88.7%, the voltage efficiency was 84.0%, and the energy efficiency was 74.5%.

What is claimed is:

1. A zinc-chloride cell wherein a gas phase in a cell container comprises a gas mixture of chlorine gas and an inert gas to allow easy control of an internal pressure of said cell during operation thereof, a device is included to trap the gas mixture and to blow the trapped gas mixture into an electrolyte, and during charging of said cell, the gas mixture is trapped and the trapped gas mixture is blown into the electrolyte so as to reduce a chlorine concentration in the electrolyte.

2. A zinc-chloride cell according to claim 1, wherein a content of the chlorine gas in the gas mixture at normal pressure is 60 to 90% by volume.

3. A zinc-chloride cell according to claim 1, wherein the inert gas is a member selected from the group consisting of nitrogen gas, argon gas, and helium gas.

4. A zinc-chloride cell according to claim 2, wherein the inert gas is a member selected from the group consisting of nitrogen gas, argon gas and helium gas.

5. A zinc-chloride cell according to claim 1, wherein the inert gas is helium gas.

6. A zinc-chloride cell according to claim 2, wherein the inert gas is helium gas.

* * * * *